2,881,174
1,1 BIS (p-AMINOPHENYL) ALKANOLS

John B. Wright, Kalamazoo Township, Kalamazoo County, Mich., assignor to The Upjohn Company, Kalamazoo, Mich., a corporation of Michigan No Drawing. Application April 25, 1958
Serial No. 730,765

15 Claims. (Cl. 260—294.7)

This invention relates to novel organic compounds, more particularly to 1,1-bis(p-aminophenyl) - 1,2 - alkanediols and 2-ethers thereof and a process for their production.

The novel compounds of this invention are prepared by reacting a p-tert.-aminophenyl lithium with an alkyl α-hydrocarbonoxyalkanoate to produce a 1,1-bis(p-aminophenyl) - 2 - hydrocarbonoxyalkanol. Alternatively, the alkyl α-hydrocarbonoxyalkanoate is substituted by an alkyl α-hydroxyalkanoate to produce a 1,1-bis(p-aminophenyl)-1,2-alkanediol. These compounds and reactions may be represented by the following formulae:

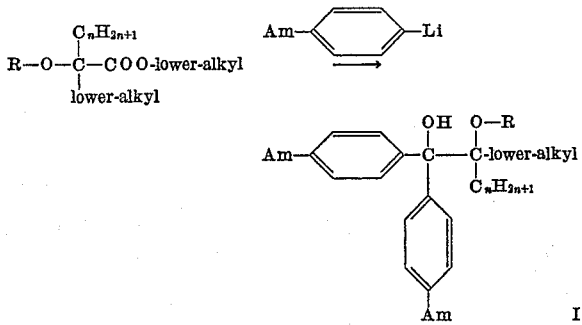

wherein Am is a tertiary amino group selected from the group consisting of di-lower-alkylamino, lower-alkylbenzylamino, dibenzylamino or an alkyleneamino group of the formula

wherein R' is an alkylene radical containing from four to eight carbon atoms, inclusive, which with the amino nitrogen atom forms a ring containing from four to five carbon atoms; $n$ is an integer from zero to eight, inclusive, and R is hydrogen or a hydrocarbon radical containing from one to eight carbon atoms, inclusive, e.g., phenyl, tolyl, xylyl, methyl, ethyl, allyl, octyl, preferably lower-alkyl. Lower-alkyl in every instance means containing from one to eight carbon atoms, inclusive. The compounds of this invention (I) are unstable in the form of their acid addition salts. Preferred are the di-lower-alkylamines, preferably dimethylamines. Also preferred are those compounds where $n$ is 0 and lower-alkyl- is methyl or ethyl.

It is an object of this invention to provide 1,1-bis(p-aminophenyl)-1,2-alkanediols and their 2-ethers (I). Another object is the provision of processes for the production thereof. Other objects will be apparent to those skilled in the art to which this invention pertains.

The 1,1-bis(p-aminophenyl)-1,2-alkanediols and 2-ethers (I) possess motor activity. They are sleep-potentiators when given with hexabarbital, thereby increasing the effectiveness of the hexabarbital or reducing the amount of hexabarbital required to achieve a desired response.

The novel compounds of this invention are also useful as intermediates in the preparation of the physiologically active 1,1-bis(p-aminophenyl)-2-alkanones and 1,1-bis(p-aminophenyl)-2-alkanols, as disclosed more fully in our copending application Serial Number 730,812, filed April 25, 1958, by reduction of the dihydroxy compounds with hydrogen and palladium on charcoal catalyst to produce 1,1-bis(p-aminophenyl)-2-alkanols and by treatment of the 1,1-bis(p-aminophenyl)-2-alkoxyalkanols with hydrochloric acid to produce the 1,1-bis(p-aminophenyl)-2-alkanones. Both the 1,1-bis(p-aminophenyl)-2-alkanols and the 1,1-bis(p-aminophenyl)-2-alkanones possess sleep-potentiation activity and are effective in the treatment of essential hypertension.

The novel compounds of this invention are prepared by reacting a p-disubstituted-aminophenyl lithium with an alkyl α-hydroxyalkanoate or an alkyl α-hydrocarbonoxyalkanoate in a non-reactive solvent, usually ether, tetrahydrofuran or a hydrocarbon solvent. The mixture is ordinarily refluxed and then decomposed with aqueous ammonium chloride to remove any excess lithium or organolithium compounds. The p-disubstituted aminophenyl lithium compounds are prepared by reacting a p-bromo-N-disubstituted-aniline with lithium in the usual manner. The alkyl α-hydroxyalkanoate or alkyl α-hydrocarbonoxyalkanoate is then added to the reaction mixture.

Compounds of the present invention thus prepared include 1,1-bis(p-dimethylaminophenyl) -1,2- propanediol, 1,1-bis(p-dimethylaminophenyl)-2- methyl - 1,2 - propanediol, 1,1-bis(p-dimethylaminophenyl) -2- methyl-1,2-butanediol, 1,1-bis(p-dimethylaminophenyl)-1,2-octanediol, 1,1-bis(p-diethylaminophenyl)-1,2-propanediol, 1,1-bis(p-diethylaminophenyl)-2-methyl-1,2-propanediol, 1,1-bis(p-diethylaminophenyl)-2-methyl-1,2-butanediol, 1,1-bis(p-diethylaminophenyl)-1,2-octanediol, 1,1-bis(p-methylbenzylaminophenyl) - 1,2 - propanediol, 1,1-bis(p-methylbenzylaminophenyl) - 2 - methyl-1,2-propanediol, 1,1-bis(p-methylbenzylaminophenyl)-2-methyl-1,2-butanediol, 1,1-bis(p-methylbenzylaminophenyl)-1,2-octanediol, 1,1-bis(p-dibenzylaminophenyl) -1,2- propanediol, 1,1-bis(p-dibenzylaminophenyl)-2-methyl-1,2-propanediol, 1,1-bis(p-dibenzylaminophenyl)-2-methyl-1,2-butanediol, 1,1-bis(p-dibenzylaminophenyl)-1,2-octanediol, and the corresponding 2-methyl and 2-ethyl ethers of each of the above compounds, e.g., 1,1-bis(p-dimethylaminophenyl)-2-methoxypropanol, 1,1-bis(p-dimethylaminophenyl)-2-ethoxypropanol, 1,1-bis(p-diethylaminophenyl) -2- ethoxypropanol, 1,1-bis(p-dimethylaminophenyl)-2-methyl-2-ethoxypropanol, 1,1-bis(p-dibenzylaminophenyl) - 2 - methyl-2-ethoxypropanol, 1,1-bis(p-dibenzylaminophenyl) -2- ethoxyoctanol, and 1,1-bis(p-pyrrolidinophenyl)-2-ethoxypropanol.

The following examples are illustrative of the process and products of the present invention, but are not to be construed as limiting.

EXAMPLE 1

*1,1-bis(p-dimethylaminophenyl)2-ethoxypropanol*

Into a flask fitted with a mechanical stirrer, dropping funnel, nitrogen inlet tube and an efficient condenser fitted with a calcium chloride drying tube was added 250 milliliters of dry ether and 5.55 grams (0.8 mole) of lithium ribbon. Over the course of about one hour there was then added eighty grams (0.4 mole) of freshly distilled, colorless p-bromodimethylaniline dissolved in 200 milliliters of dry ether. Occasional heat was applied to maintain reflux. After addition was complete, reflux was continued for a total of about four hours until practically all of the lithium had reacted.

To the stirred solution of dimethylaminophenyl lithium was added a solution of 29.2 grams of ethyl α-ethoxypropionate in 100 milliliters of dry ether over a period of about fifteen minutes so as to maintain a vigorous reflux. Upon addition of the ester, a white solid precipitated immediately. The mixture was maintained overnight and then heated under reflux for two hours. To the stirred solution was then cautiously added 200 milliliters of a twenty percent ammonium chloride solution. The ether layer was separated and the aqueous layer extracted once with 100 milliliters of ether. The combined ethereal solutions upon standing a short time precipitated a solid which was removed by filtration and the filtrate evaporated to dryness in vacuo at room temperature. There was thus obtained 57.1 (88 percent) of 1,1-bis(p-dimethylaminophenyl)-2-ethoxypropanol melting at 109 to 115 degrees centigrade. Two crystallizations from Skellysolve C raised the melting point to 120.5 to 121 degrees.

*Analysis.*—Calculated for $C_{21}H_{30}N_2O_2$: C, 73.64; H, 8.83; N, 8.18. Found: C, 74.09; H, 8.76; N, 8.09.

Example 2

*1,1-bis(p-dimethylaminophenyl)-2-ethoxybutanol*

The procedure of Example 1 was followed on a one-half scale using ethyl α-ethoxybutyrate. The recrystallization from Skellysolve C gave 21.5 grams (seventy percent) of tan crystals of 1,1-bis(p-dimethylaminophenyl)-2-ethoxybutanol melting at 104 to 109 degrees centigrade. Recrystallization from Skellysolve C raised the melting point to 110.5 to 112 degrees.

*Analysis.*—Calculated for $C_{22}H_{32}N_2O_2$: C, 74.12; H, 9.05; N, 7.86. Found: C, 74.00; H, 8.96; N, 7.82.

Example 3

*1,1-bis(p-dibenzylaminophenyl)-2-ethoxypropanol*

A twelve liter flask fitted with stirrer, a reflux condenser fitted with a drying tube and a dropping funnel was flushed with nitrogen. To the flask was added 240 grams (0.68 mole) of N-(p-bromophenyl)-dibenzylamine, 5,760 milliliters of anyhdrous ether and 9.44 grams (1.36 moles) of lithium ribbon (or lithium emulsion). The mixture was stirred and heated at reflux for six hours.

To the reaction mixture containing p-dibenzylaminophenyl lithium was slowly added with stirring 49.7 grams (0.34 mole) of ethyl α-ethoxypropionate in 150 milliliters of anhydrous ether and refluxing was continued for two hours. The addition product was decomposed with twenty percent aqueous ammonium chloride and the layers separated. The ether layer was washed with water, dried over anhydrous magnesium sulfate and evaporated to dryness in vacuo, leaving an oily residue of 1,1-bis(p-dibenzylaminophenyl)-2-ethoxypropanol.

Example 4

*1,1-bis(p-methylbenzlaminophenyl)-2-ethoxypropanol*

To a stirred mixture of 425 milliliters of sodium dried ether and 9.44 grams (1.36 moles) of lithium ribbon was added 187.7 grams (0.68 mole) of p-bromo-N-methyl-N-benzylaniline in 340 milliliters of ether over a period of 45 minutes. The mixture was refluxed for one and one-half hours and then 49.7 grams (0.34 mole) of ethyl α-ethoxypropionate in 170 milliliters of dry ether was added over a period of thirty minutes. A solid precipitated as the ester was added. The mixture was refluxed for two hours. To the stirred, cooled mixture was cautiously added 400 milliliters of a twenty percent aqueous ammonium chloride solution. The ether layer was separated and the aqueous layer extracted with ether. The combined ether layers were dried over magnesium sulfate and distilled to dryness in vacuo. There remained an oily residue of 183.2 grams of 1,1-bis(p-methylbenzlaminophenyl)-2-ethoxypropanol.

Example 5

*1,1-bis(p-piperidinophenyl)-2-ethoxypropanol*

To 2,78 grams (0.4 mole) of small pieces of lithium ribbon in 100 milliliters of anhydrous ether was added a slurry of 48.09 grams (0.25 mole) of N-(p-bromophenyl)piperidine in 250 milliliters of anhydrous ether. The mixture was stirred and refluxed for two hours and to the resulting solution of p-piperidinophenyl lithium was added a solution of 14.6 grams (0.1 mole) of ethyl α-ethoxypropionate in fifty milliliters of anhydrous ether. The mixture was stirred and refluxed for four hours. To the cooled solution was added 100 milliliters of twenty percent ammonium chloride solution, causing a precipitate. After standing overnight, the mixture was filtered and the filtrate extracted with ether. There was obtained 27.4 grams of 1,1-bis(p-piperidinophenyl)-2-ethoxypropanol from the cake melting at 144 to 145 degrees centigrade, and 3.6 grams from the ether. Recrystallization of the cake from ethanol gave product melting at 150 to 153 degrees.

*Analysis.*—Calculated for $C_{27}H_{38}N_2O_2$: C, 76.73; H, 9.06; N, 6.63. Found: C, 76.83; H, 9.02; N, 6.78.

Example 6

*1,1-bis(p-dimethylaminophenyl)-2-methyl-1,2-propanediol*

To a stirred mixture of 5.55 grams (0.8 mole) of lithium ribbon and 250 milliliters of ether was added eighty grams (0.4 mole) of p-bromo-N-dimethylaniline in 200 milliliters of dry ether over a period of thirty minutes. The mixture was refluxed for four and one-half hours and to it was then added 13.2 grams of freshly distilled ethyl α-hydroxyisobutyrate in fifty milliliters of dry ether over a period of ten minutes. The mixture was refluxed for five hours and to the cooled, stirred solution was added 200 milliliters of a twenty percent aqueous ammonium chloride solution. The ether layer was separated and the aqueous layer extracted with 200 milliliters of ether. The combined ether layers were dried over magnesium sulfate and the ether then evaporated to dryness, removing the last traces of ether in vacuo. Crystallization of the oily yellow solid from Skellysolve C gave 27.43 grams (84 percent) of cream-colored needles of 1,1-bis(p-dimethylaminophenyl)-2-methyl-1,2-propanediol melting at 121 to 123 degrees centigrade. Two more crystallizations from Skellysolve C raised the melting point to 123 to 125.5 degrees.

*Analysis.*—Calculated for $C_{20}H_{28}N_2O_2$: C, 73.13; H, 8.59; N, 8.53. Found: C, 72.78; H, 8.43; N, 8.53.

Example 7

*1,1-bis(p-methylbenzlaminophenyl)-2-methyl-1,2-propanediol*

To a stirred mixture of 11.1 grams (1.6 moles) of lithium ribbon in 500 milliliters of anhydrous ether was added 221 grams (0.8 mole) of p-bromomethylbenzylaniline dissolved in 400 milliliters of anhydrous ether over a period of forty minutes. The mixture was refluxed with stirring for four hours and to the mixture containing the p-methylbenzylaminophenyl lithium was added 26.4 grams (0.2 mole) of ethyl α-hydroxyisobutyrate in 100 milliters of ether. The mixture was refluxed for four hours and then decomposed with 400 milliliters of twenty percent ammonium chloride solution. The ether layer was separated, dried and the ether distilled to give a dark yellow oil. The oil was washed with 95 percent ethyl alcohol which was decanted off and the remainder removed in vacuo to give 171.6 grams of 1,1-bis(p-methylaminophenyl)-2-methyl 1,2-propanediol.

Example 8

*1,1-bis(p-dimethylaminophenyl)-2-phenoxypropanol*

To a mixture of 5.55 grams (0.8 mole) of lithium ribbon in 250 milliliters of anhydrous ether was added eighty grams (0.4 mole) of p-bromodimethylaniline, dissolved in 200 milliliters of anhydrous ether, over a period of forty minutes. The mixture was refluxed for one hour and to the resulting solution of p-dimethylaminophenyl lithium was then added 38.84 grams (0.2 mole) of ethyl α-phenoxypropionate. The mixture was refluxed for two hours and then decomposed with 200 milliliters of twenty percent aqueous ammonium chloride. The solid which precipitated was separated and washed with ether to give 80.1 grams of 1,1-bis(p-dimethylaminophenyl)-2-phenoxypropanol melting at 164 degrees centigrade (dec.). Two recrystallizations from benzene raised the melting point to 191 to 193 degrees centigrade.

*Analysis.*—Calculated for $C_{25}H_{30}N_2O_2$: C, 76.89; H, 7.74; N, 7.17. Found: C, 77.30; H, 7.61; N, 7.08.

It is to be understood that the invention is not to be limited to the exact compounds shown and described, as obvious modifications and equivalents will be apparent to one skilled in the art, and the invention is therefore to be limited only by the scope of the appended claims.

I claim:

1. 1,1-bis(p-aminophenyl)-2-oxyalkanols represented by the formula

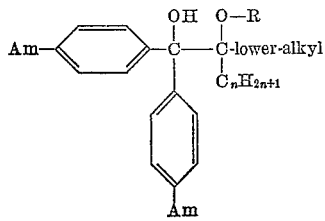

wherein $n$ is an integer from zero to eight, inclusive; R is selected from the group consisting of hydrogen and hydrocarbon radicals containing from one to eight carbon atoms, inclusive, and Am is a tertiary amino group selected from the group consisting of di-lower-alkylamino, dibenzylamino, lower-alkylbenzylamino and alkyleneamino of the formula

wherein R' is an alkylene group containing from four to eight carbon atoms, inclusive, which with the amino nitrogen atom forms a ring containing from four to five carbon atoms.

2. 1,1-bis(p-dibenzylaminophenyl) - 2 - alkoxyalkanols represented by the formula

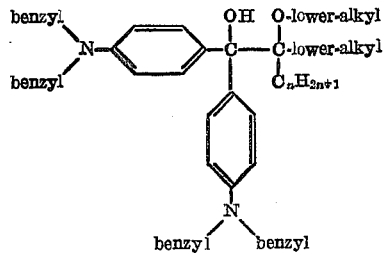

wherein $n$ is an integer from zero to eight, inclusive.

3. 1,1-bis(p-dibenzylaminophenyl)-2-ethoxypropanol.

4. 1,1-bis(p-aminophenyl) - 2 - alkoxyalkanols represented by the formula

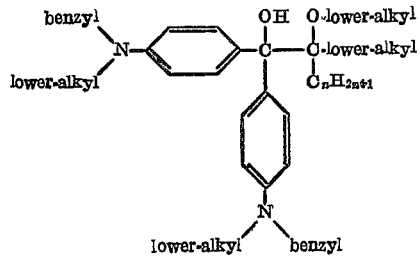

where $n$ is an integer from zero to eight, inclusive.

5. 1,1 - bis(p - methylbenzylaminophenyl) - 2 - ethoxypropanol.

6. 1,1-bis(p-dialkylaminophenyl)-2-alkoxyalkanols represented by the formula

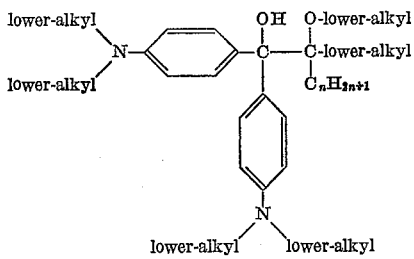

wherein $n$ is an integer from zero to eight, inclusive.

7. 1,1-bis(p-dimethylaminophenyl)-2-ethoxypropanol.

8. 1,1 - bis(p - dimethylaminophenyl) - 2 - phenoxypropanol.

9. 1,1-bis(p-dimethylaminophenyl)-2-ethoxybutanol.

10. 1,1-bis(p-di-lower-alkylaminophenyl)-1,2 - alkanediols represented by the formula

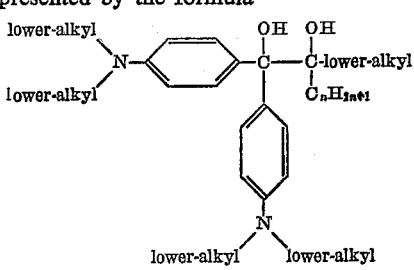

wherein $n$ is an integer from zero to eight, inclusive.

11. 1,1-bis(p-dimethylaminophenyl) - 2 - methyl - 1,2-propanediol.

12. 1,1-bis(p-piperidinophenyl)-2-alkoxyalkanols represented by the formula

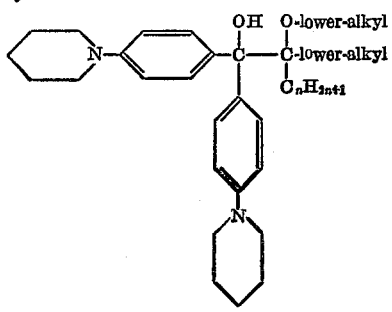

wherein $n$ is an integer from zero to eight, inclusive.

13. 1,1-bis(p-piperidinophenyl)-2-ethoxypropanol.

14. 1,1-bis(p - lower - alkylbenzylaminophenyl) - 1,2 - propanediols represented by the formula

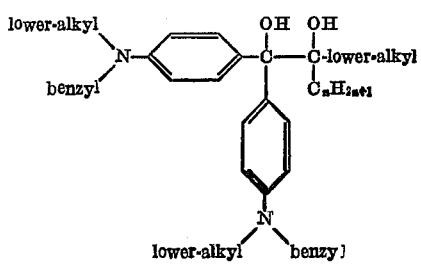

15. 1,1-bis(p - methylbenzylaminophenyl) - 2 - methyl-1,2-propanediol.

No references cited.

UNITED STATES PATENT OFFICE
Certificate of Correction

Patent No. 2,881,174                                             April 7, 1959

John B. Wright

It is hereby certified that error appears in the printed specification of the above numbered patent requiring correction and that the said Letters Patent should read as corrected below.

Column 4, line 48, for "*(p-methylbenzlaminophenyl)-*" read —*(p-methylbenzylaminophenyl)*- —; lines 64 and 65, for "(p-methylaminophenyl)-2-methyl 1,2-propanediol." read —(p-methylbenzylaminophenyl)-2-methyl-1,2-propanediol.—.

Signed and sealed this 1st day of September 1959.

[SEAL]

Attest:
KARL H. AXLINE,
*Attesting Officer.*

ROBERT C. WATSON,
*Commissioner of Patents.*